United States Patent [19]

Ritsema

[11] Patent Number: 4,573,554
[45] Date of Patent: Mar. 4, 1986

[54] DISC BRAKE WITH CALIPER STABILIZING TIE-BAR

[75] Inventor: Irving R. Ritsema, South Bend, Ind.

[73] Assignee: Allied Corporation, Morristown, N.J.

[21] Appl. No.: 746,923

[22] Filed: Jun. 19, 1985

Related U.S. Application Data

[63] Continuation of Ser. No. 538,605, Oct. 3, 1983, abandoned.

[51] Int. Cl.⁴ .................... F16D 55/224; F16D 65/02
[52] U.S. Cl. .................. 188/73.38; 188/73.39; 188/73.45
[58] Field of Search ............... 188/72.4, 73.31, 73.32, 188/73.33, 73.34, 73.38, 73.39, 73.45, 206 R, 206 A

[56] References Cited

U.S. PATENT DOCUMENTS

| 3,416,634 | 12/1968 | Swift | 188/73.39 X |
| 3,935,927 | 2/1976 | Haraikawa | 188/73.39 |
| 3,976,169 | 8/1976 | Ogawa | 188/73.39 |
| 4,111,285 | 9/1978 | Honick | 188/73.34 |
| 4,220,224 | 9/1980 | Karasudani | 188/73.39 |
| 4,341,289 | 7/1982 | Smith | 188/73.39 |
| 4,530,423 | 7/1985 | Ritsema | 188/73.39 |

FOREIGN PATENT DOCUMENTS

| 2334232 | 1/1975 | Fed. Rep. of Germany | 188/73.38 |
| 2850439 | 5/1979 | Fed. Rep. of Germany | |
| 56-10837 | 2/1981 | Japan | 188/73.45 |
| 56-143825 | 11/1981 | Japan | 188/73.39 |

Primary Examiner—Bruce H. Stoner, Jr.
Assistant Examiner—Richard R. Diefendorf
Attorney, Agent, or Firm—Larry J. Palguta; Ken C. Decker

[57] ABSTRACT

A disc brake includes a caliper cooperating with a pair of friction elements to oppose rotation of a rotor during braking. A torque member supports the caliper and defines a tie bar reinforcing a pair of arms for the torque member. A connecting member extends between a caliper inner and outer leg and cooperates with the tie bar to oppose static caliper droop and dynamic caliper lift.

2 Claims, 3 Drawing Figures

DISC BRAKE WITH CALIPER STABILIZING TIE-BAR

This is a continuation of application Ser. No. 538,605 filed Oct. 3, 1983, now abandoned.

This invention relates to a disc brake wherein a torque member movably carries a caliper which cooperates with a pair of friction elements to engage the latter with a rotor during braking.

Disc brakes are being used with heavy vehicles, such as trucks having a gross vehicle weight of 24,000 pounds. Because of the kinetic energy developed by a heavy vehicle, it is necessary to design a disc brake for such a vehicle with larger friction elements, a larger torque member and a larger caliper with more than one piston. Consequently, the disc brake assembly for a heavy vehicle is in itself heavier than normally used with passenger cars. The added weight for the truck disc brake causes the caliper to droop in a static mode as well as lift in a dynamic load. That is, an inner leg of the caliper receiving the pistons is heavier than an outer leg of the caliper, so that an inboard pin assembly supporting the caliper will be loaded radially inward. If the pin bends slightly about the torque member in response to the loading, the inner leg will droop or move radially inward and the outer leg will move radially outward. Also, during braking, the friction forces between the friction elements and the rotor will bias the caliper to lift radially outward away from the torque member. With the inner leg of the caliper engaging the pin assembly, the outer leg of the caliper will lift to a greater degree than the inner leg of the caliper.

The prior art is illustrated in U.S. Pat. No. 3,494,448.

The present invention provides a solution to the static droop and the dynamic lift characteristics of the disc brake caliper. In particular, the present invention provides a disc brake comprising a torque member fixedly secured to a vehicle or the like adjacent a rotor to be braked, a caliper movably carried by the torque member and forming an inner leg on one side of the rotor, an outer leg on the other side of the rotor and a bridge extending axially between the inner and outer legs over an outer edge of the rotor, the caliper cooperating with a pair of friction elements to bias the latter into engagement with the rotor during braking, and a connecting member extending between the inner and outer legs to oppose deflection between the inner and outer legs, characterized in that said torque member includes a tie bar extending circumferentially over a portion of the outer edge of said rotor and contained axially between said pair of friction elements, said tie bar cooperating with said connecting member to define an interface therebetween opposing static droop and dynamic lift when the inner leg of said caliper tends to move radially inward and the outer leg of said caliper tends to move radially outward.

It is an advantage of the present invention that the connecting member opposes axial separation between the inner and outer legs of the caliper as well as limiting droop and lift for the caliper.

The accompanying drawings illustrate one embodiment of the invention.

Figure 2:
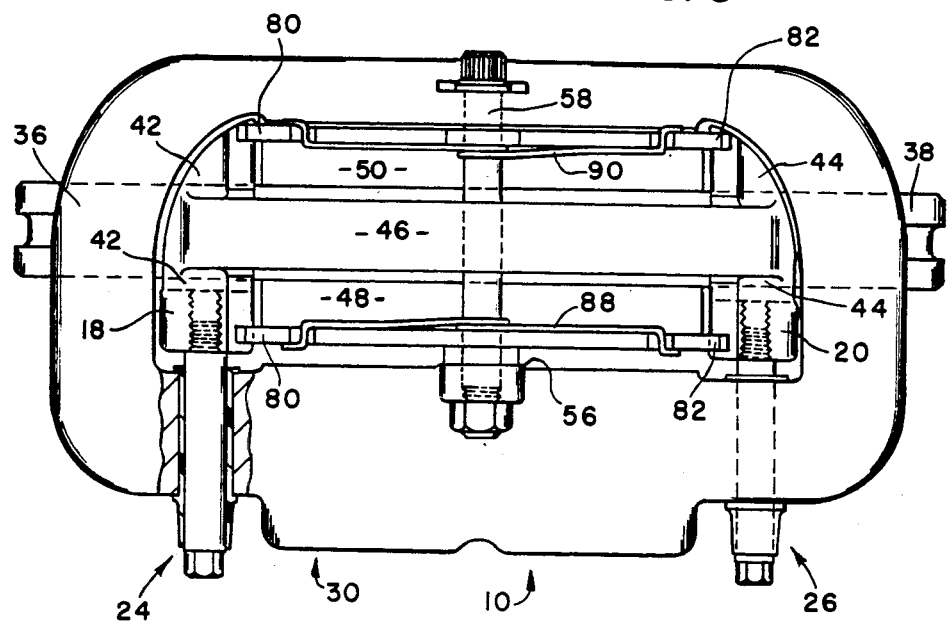
FIG. 2 is a top view of the disc brake shown in FIG. 1.

A disc brake 10 includes a torque member 12 secured to a vehicle flange 14 via suitable means such as bolts 16. The torque member 12 defines spaced arms 18 and 20 forming a recess 22. A pair of pin assemblies 24 and 26, see FIG. 2, are fastened to the torque member to movably carry a caliper 30 with an inner leg 32 in the recess 22, an outer leg 34 facing the inner leg and a bridge 36 connecting the legs 32 and 34. The bridge 36 extends over an outer edge 38 of a rotor 40.

In FIG. 2, the torque member arms 18 and 20 terminate in axially extending flanges 42 and 44, respectively, extending over the rotor edge 38. The flanges 42 and 44 are connected via a tie bar 46 to oppose movement or separation between the flanges 42 and 44. A pair of friction elements 48 and 50 are movably carried on the flanges 42 and 44 such that friction element 48 is disposed between rotor 40 and inner leg 32 and friction element 50 is disposed between rotor 40 and outer leg 34.

Figure 1:
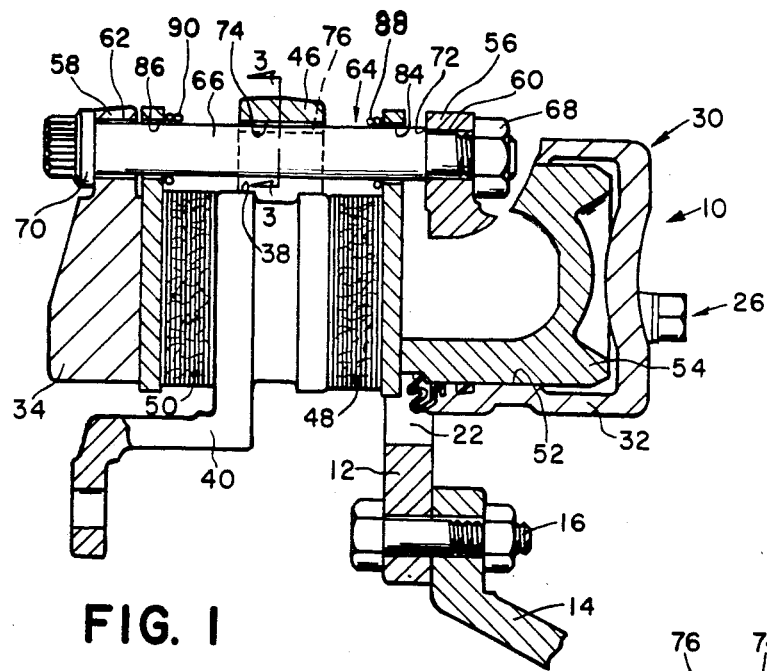
FIG. 1 is a side offset cross-sectional view of a disc brake constructed in accordance with the present invention.
Figure 3:
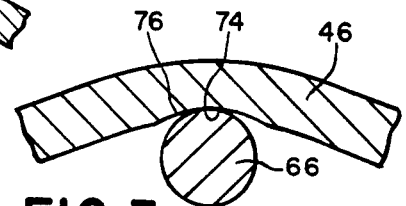
FIG. 3 is a view taken along line 3—3 of FIG. 1.

The caliper inner leg 32 is formed with a pair of bores, one of which is shown in FIG. 1 at 52, for sealingly receiving a pair of pistons, one of which is shown in FIG. 1 at 54. The pistons cooperate with the wall of the bores to form pressure chambers capable of receiving fluid pressure during braking. The caliper inner leg 32 forms a radially extending rib 56 between the pair of pistons while the outer leg 34 also forms a radially extending rib 58. Both ribs 56 and 58 are provided with openings 60 and 62, respectively, for receiving a connecting member 64 comprising a bolt 66 and a nut 68. The opening 62 is larger than the opening 60 so that a large diameter portion of bolt 66 adjacent head 70 fits within opening 62 and a small diameter portion of bolt 66 adjacent nut 68 fits within opening 60. A shoulder 72 on the bolt between the large and small diameter portions abuts the rib 56 to limit the spacing between the ribs when the nut 68 is tightly secured to the bolt. The tie bar 46 is provided with a recess 74 defining an arcuate surface 76 substantially matching the outer surface of bolt 66. The bolt 66 extends into the recess 74 and is capable of slidably engaging the arcuate surface 76 as described more fully hereinafter. The arcuate surface 76 is a smooth surface which provides for the slidable engagement with bolt 66, and may be provided by machining or other suitable methods.

Each friction element 48 and 50 is provided with transversely extending ears 80 and 82 slidably engaging the radial outer edge of the flanges 42 and 44, respectively. The friction elements also abut the inner edge of the respective flanges to transmit braking torque to the torque member 12. The bolt 66 extends through openings 84 and 86 on friction elements 48 and 50, respectively, to retain the friction elements in position between the torque member flanges 42 and 44. A pair of springs 88 and 90 coil around the bolt 66 and engage the friction elements 48 and 50, respectively, to oppose rattling between the friction elements, the bolt and the flanges.

Viewing FIG. 1, the caliper 30 receives fluid pressure during braking to move to the right while the piston 54 moves to the left. The friction elements engage the rotor 40 to retard rotation of the latter. The inner leg 30 of the caliper includes more mass than the outer leg because the inner leg is provided with the extended bores for receiving the pistons. Consequently, the inner leg transmits a verticle static force to the pin assemblies 24 and 26. With the pin assemblies secured at one end to the torque member 12, the verticle static force biases the pin assemblies to bend radially inward slightly about the torque member 12 to lift the outer leg 34 and droop the inner leg 34. When the outer leg is lifted, the bolt 66 is also moved outward to fully engage the tie bar 46 which opposes further lifting of the outer leg. As the friction elements are worn, the caliper moves further to the right, so that the pin assemblies will be further stressed via the static force biasing the pin assemblies to bend about the torque member.

In addition to the static forces, the friction elements engage the rotating rotor during braking. Frictional forces are transmitted from the rotor to the friction elements, which, in turn, abut one of the torque member arms to transmit the frictional forces thereto. With the rotor rotating about its axis and the trailing edge of each friction element abutting the torque member, the friction elements are biased outwardly at their leading edge. This outward bias is transmitted to the caliper via the engagement between the friction elements and the inner and outer caliper legs. In addition, the caliper inner and outer legs are loaded in opposite directions tending to lift the caliper radially outwardly.

I claim:

1. A disc brake comprising a torque member fixedly secured to a vehicle or the like adjacent a rotor to be braked, a caliper movably carried by the torque member and forming an inner leg on one side of the rotor, an outer leg on the other side of the rotor and a bridge extending axially between the inner and outer legs over an outer edge of the rotor, the caliper cooperating with a pair of friction elements to bias the latter into engagement with the rotor during braking, and a connecting member extending between the inner and outer legs to oppose deflection between the inner and outer legs, characterized in that said torque member includes a tie-bar extending circumferentially over a portion of the outer edge of said rotor and disposed axially between said pair of friction elements, said tie-bar cooperating by direct engagement with said connecting member to define an interface therebetween opposing static droop and dynamic lift when the inner leg of said caliper tends to move radially inwardly and the outer leg of the caliper tends to move radially outwardly, respectively, the tie-bar defining a radial spacing with the portion of the outer edge of said rotor and said connecting member extending through said radial spacing, the interface being formed by sliding engagement between only said connecting member and tie-bar and including an open arcuate recess in an open underside of said tie-bar forming a smooth, machined surface extending circumferentially over only a radially outer portion of the connecting member and facing radially inward, said connecting member extending into said recess so that the radially outer portion of said connecting member slidably engages directly said surface.

2. The disc brake of claim 1, wherein the friction elements include support plates each having an opening therein, said connecting member extending through the openings and supporting a pair of springs which engage said plates to prevent rattling thereof.

* * * * *